United States Patent Office 2,783,149
Patented Feb. 26, 1957

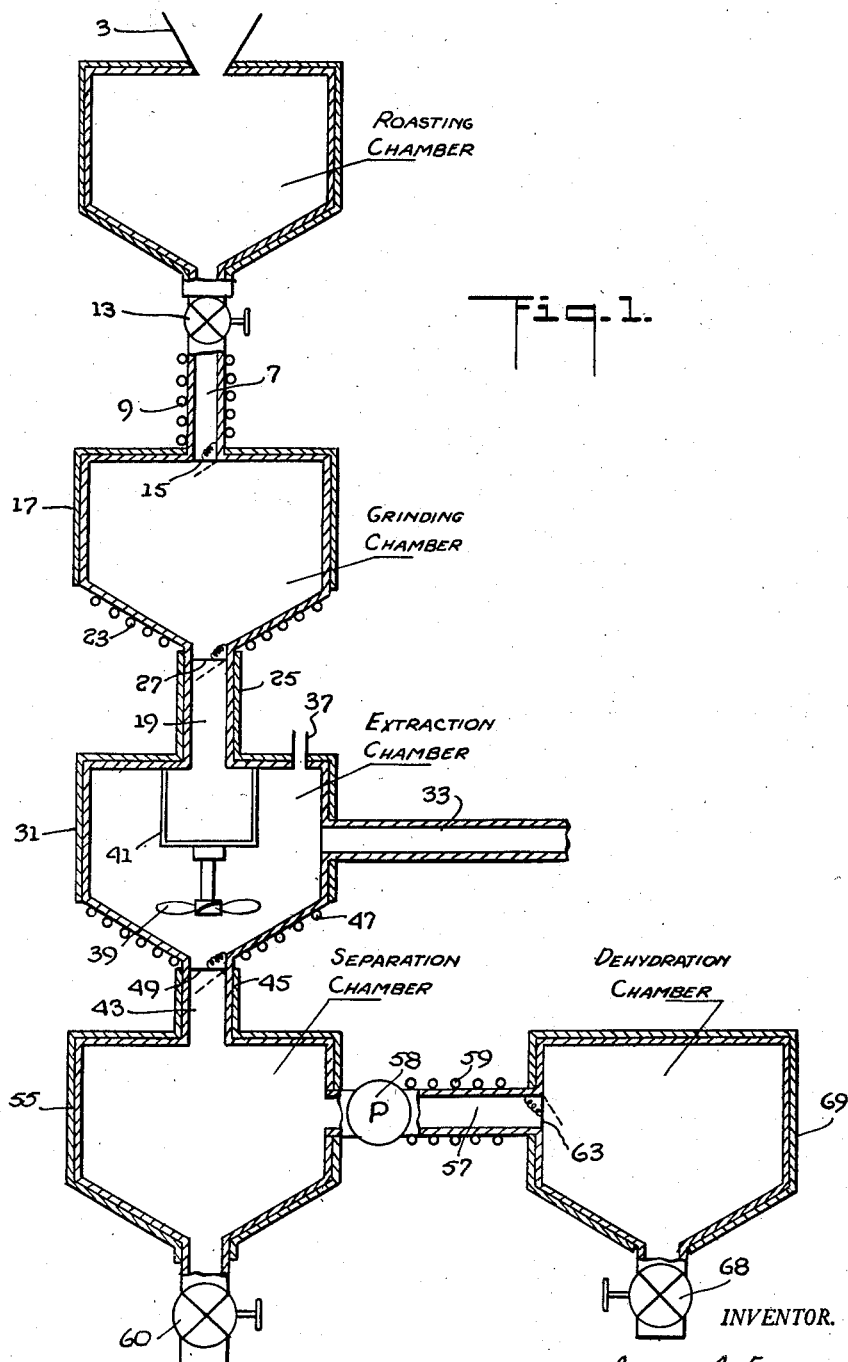

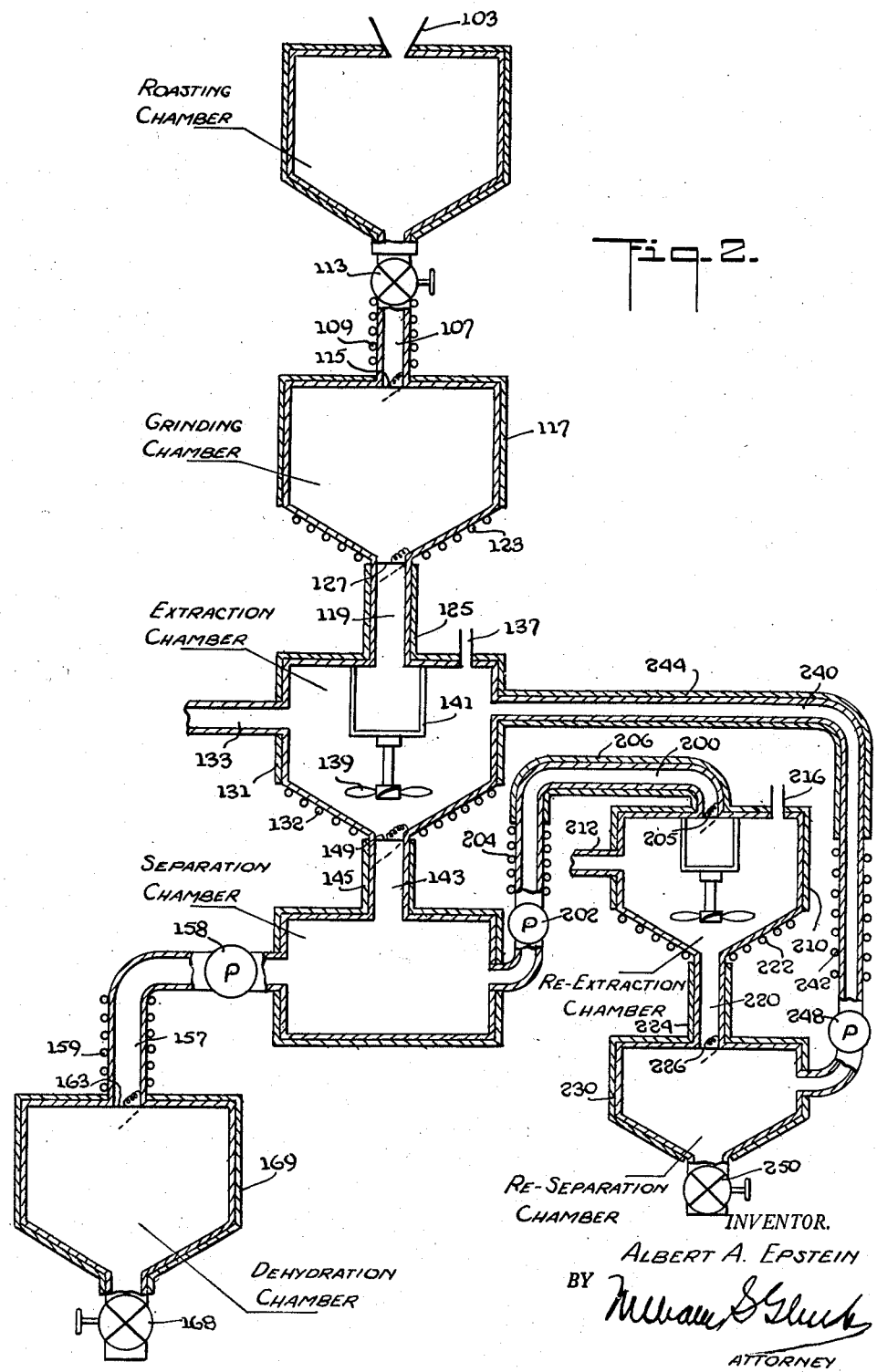

2,783,149

METHOD OF PRODUCING A COFFEE EXTRACT

Albert A. Epstein, Carmel, N. Y., assignor to Violet de Beck Epstein, Carmel, N. Y.

Application August 10, 1953, Serial No. 373,185

5 Claims. (Cl. 99—71)

This invention relates to the manner and means of producing a coffee extract for use as an essence for making beverage coffee.

Its preparation entails the extraction of the soluble ingredients and volatile aromatic substances contained in coffee into a fluid such as water and separating out the fluid extract; where the extract is made from ground coffee, it entails also the steps of first roasting and grinding the coffee; and where it is desired that the ultimate product be in the form of a dry powder the preparation of the extract entails additionally, dehydration of the fluid extract.

Where heat is used in extraction, I have found that the extract which results lacks much of the aromatic substances and other soluble ingredients of the ground coffee from which it is extracted; it undergoes a considerable degree of carmelization which gives it a foreign licorice-like flavor; it is highly hygroscopic; and therefore its taste and flavor undergo marked and considerable changes soon after the container has been opened and coffee beverages made therefrom fall far short of the qualities which freshly brewed coffee possesses. Where heat is used also in dehydration these and other shortcomings in the extract become more marked.

While extraction by cold water obviates some of the aforementioned shortcomings, the process is much slower and requires more time than extraction by heat and therefore exposes the coffee to deterioration as a result of prolonged contact with water, etc.

One of the general objects of the invention is to accelerate the cold process, for optimum extraction of the aromatic substances and soluble ingredients of coffee, in minimum time.

Another general object of the invention is an extract which is comprised wholly and only of substances and ingredients of the roasted ground coffee from which it is extracted and which contains substantially all of the soluble ingredients and volatile aromatic substances contained therein. In the liquid state it is highly concentrated. In the dehydrated state it is more stable and less hygroscopic, because caramelization and dextrinization are less prone to occur by the method employed.

The process of this invention for attaining any one or any group of the aforementioned objects includes or comprises one or more of the following: subjecting the coffee to the solvent action of cold water having a low pH; subjecting the coffee to the solvent action of cold carbonated water; subjecting the ground coffee particles to the dispersal action of carbon dioxide; replacing the included air between the coffee particles with carbon dioxide; replacing the air above the water with carbon dioxide; replacing the air included in the water with carbon dioxide; adding Dry Ice to perform any one of the foregoing steps; and adding a sufficient amount of Dry Ice to perform any group of the foregoing steps simultaneously.

Among the other provisions for assuring the attainment of any or all of the aforementioned ultimate and other objects of the invention is the separation of the coffee extract from the coffee residue by a centrifugal separator at low temperatures.

The accompanying drawings illustrate a preferred apparatus wherein and whereby the process can be practised with optimum results.

In the drawings:

Fig. 1 is a schematic and diagrammatic view showing one embodiment of the apparatus for making the extract; and Fig. 2 is a schematic and diagrammatic view showing a modified embodiment of the apparatus for making the extract.

One of the important features of this invention is that the soluble substances and volatile aromatic ingredients be extracted from coffee under low or cold temperatures which will herein be understood as meaning temperatures substantially below the boiling point of water. Optimum results will be attained at temperatures between 15° C. and 18° C. Good results can be attained even where the temperature is below 15° C.

The practice of the invention herein disclosed contemplates that the coffee and the water be conditioned for optimum extracting and that the soluble substances and volatile aromatic ingredients of coffee be extracted by subjecting the coffee to the solvent action of cold carbonated water. The use of cold carbonated water preserves all of the aromatic substances, accelerates the process so that it can be performed in a matter of minutes, eliminates the oxidative action of atmospheric air and prevents deterioration of the coffee which results from such oxidative action. In addition since less water will be required, the liquid extract will be concentrated which in turn will reduce the time required for dehydration. The carbon dioxide in the water lowers the pH of the water which in turn makes some of the ingredients, such as caffein for example, more soluble. This is true of caffein apparently because the carbon dioxide may combine with the caffein to form a corbonate which is more soluble than this ingredient in alkaloid form, or possibly because the caffein present in the coffee is combined with tannic acid in the form of a tannate in which event the treatment with cold carbonated water may cause a dissassociation of the caffein tannate, thus setting the caffein free.

The conditioning of the coffee and the water permits the process to be practiced in a shorter amount of time and is designed to exclude all oxidative agents to thereby prevent oxidative deterioration of the coffee extract. Subjecting the ground coffee particles to the dispersal action of carbon dioxide exposes the particles of coffee to more of the extracting medium thereby enabling a more concentrated extract to be obtained in a minimum amount of time. Replacing the included air between the coffee particles with carbon dioxide removes the interfering surface tension which air produces around the coffee particles, thereby permitting the water to moisten the particles more rapidly and enabling the water to act on the coffee particles almost instantaneously. Replacement of the air above the water with carbon dioxide removes the oxidative agents of the air above the coffee from attacking the ground coffee, while replacing the air in the water removes the oxidative agents from within the water to thereby prevent those agents from attacking the coffee particles.

A further feature of the invention is the utilization of Dry Ice or solid carbonic acid gas. This achieves several purposes; namely, it carbonates the water and chills it at the same time and further shortens the time required to perform the process since the Dry Ice distintegates into free carbon dioxide gas and charges the water. It also disperses the ground coffee particles, replaces the included air between the coffee particles, replaces the air above the water with carbon dioxide and replaces the air included in the water with carbon dioxide. Furthermore, a sufficient amount of Dry Ice is added to perform all of the foregoing steps simultaneously. I have found by actual tests that the drop in the temperature of the water caused by the disintegration of the Dry Ice may amount to as much as 50%, depending of course on the quantitative relationship of the Dry Ice and the water, as well as the initial temperature of the water. For example, 5 gms. of Dry Ice placed in 100 cc. of water at 32° C. will reduce the temperature to 16° C. in the course of its disintegration.

The amount of Dry Ice necessary for the carbonation of a given amount of water can be computed from the known facts concerning the volume of gas which a given amount of Dry Ice can produce, and the solubility of this gas in water under certain temperature and pressure conditions.

It is known that $CO_2$ dissolves in water to the extent of 1.02 volumes per volume of water at 15.5° C., at atmospheric pressure (15 lbs.); and up to 1.7 volumes of water at 0° C. under the same pressure conditions. It is also known that 1 pound of Dry Ice can produce 8.544 cu. ft of $CO_2$ at 15.5° C. and 15 pounds of atmospheric pressure: i. e. approximately 60 gallons or 480 pints. Inasmuch as there are 480 gms. to the pound, each gm. of Dry Ice can saturate 1 pint of water in the course of its disintegration under the temperature and pressure conditions mentioned above. The application of this principle affords a method of procedure which is simple, efficient and economical.

In actual practice a somewhat larger amount of Dry Ice is used than is necessary for the saturation of a given amount of water. By this means loss of $CO_2$ by volatilization incidental to handling is avoided. Furthermore, owing to the fact that $CO_2$ is heavier than air, the excess of $CO_2$ gas evolved from the additional Dry Ice serves to break up agglomerations of coffee grounds, displace air included in the water, and to displace the included air between the coffee grounds, as well as the free air present in the extraction chamber, all as stated above. As a result of these occurences, moistening of the grounds is greatly accelerated. It is to be noted that the excess of $CO_2$ produces no injurious effect upon the coffee. I have found that one pound of Dry Ice mixed with 300 pints of water for every 100 pounds of coffee will give the desired excess. This is equivalent to adding approximately 4.5 grams of Dry Ice to each three pints of water and pound of coffee.

To further prevent the loss of soluble ingredients and volatile aromatic substances contained in the roasted bean, the roasted coffee is chilled immediately after roasting, and before grinding; the chilled bean is ground at cold temperatures; the volatile aromatic ingredients and soluble substances are extracted from the ground coffee at low temperatures; the aqueous extract is separated from the coffee residue by a centrifugal separator at low temperatures; and the separated aqueous extract is dehydrated at low temperatures. The use of a centrifugal separator achieves the greatest speed in separating the coffee grounds from the extract thereby preventing oxidation of the mixture. The invention contemplates further that whichever of these other steps are practiced, that they be performed quickly and successively without loss of time.

The resulting dry coffee extract, by virtue of the fact that it is neither dextrinized or caramelized by this process, as contrasted with other methods, is less subject to hygroscopic action, and retains the natural flavor and aroma for a longer period of time.

Fig. 1 of the drawings is intended to illustrate diagrammatically an apparatus for making a dry extract from the green bean by a process comprised of individual steps which will be described as continuous. It will be understood however that the inventive features reside in individual steps and also in the continuity of a plurality of such steps.

The roasting chamber has an inlet funnel 3 to allow green coffee beans to be entered thereinto. The roasting chamber has the conventional means (not shown) for roasting the green coffee bean. A grinding chamber is connected to the roasting chamber by the chute 7 which is adapted to convey the roasted coffee from the roasting chamber to the grinding chamber. The chute 7 is surrounded by a cooling coil 9 of a conventional nature for chilling or cooling the roasted coffee as it passes therethrough. The manual valve 13 is normally closed and during roasting insulates the chute 7 to prevent heat from the roasting chamber from entering the chute 7. It is opened only to allow the coffee beans to pass into the chute. A normally closed valve 15, which may be operable automatically by the weight of the coffee in a conventional manner, opens into the grinding chamber. The grinding chamber is provided with insulation 17 and the cooling coil 23 to maintain its internal temperature low. Conventional grinding means (not shown) within the grinding chamber grinds the coffee. A chute 19 connecting the grinding chamber to the extraction chamber allows ground coffee to pass from the grinding chamber into the extraction chamber. The chute 19 may be constructed similarly to chute 7 and is insulated as shown at 25 and is normally closed by valve 27 which may be operable similarly to valve 15 to maintain the coffee at a low temperature.

The extracting chamber is provided with insulation 31 and cooling coil 47 to maintain its internal temperature low and has a port 33 closeable by a plug (not shown) to allow the materials used to process the ground coffee, to be entered into the extraction chamber. A valve 37 is provided in the extraction chamber to allow venting atmospheric air from the extraction chamber, as will be pointed out hereinafter. The extraction chamber may be of a conventional nature and preferably is of the stirring type having the rotating stirrer 39 carried by the bracket 41.

A chute 43 connects the extraction chamber to the separation chamber and allows the coffee extract and residue to pass therethrough. The chute 43 is constructed similarly to the chute 7 having insulation 45. It is normally closed by valve 49 which may be weight operated similarly to valve 15.

It is preferred that separation be effected by means such as a centrifugal separator to thereby expedite the process. The separation chamber is insulated as shown at 55 also to maintain its internal temperature low. The chute 57 connects the separation chamber with the dehydration chamber and allows the liquid coffee extract to be passed therethrough by gravity or as by means of pump 58. Chute 57 has cooling coil 59, and normally closed valve 63 operable similarly to door 15, to maintain the coffee passing therethrough at a low temperature. Valve 60 operated manually or automatically as by the weight of the coffee in a conventional manner, allows the residue to pass out of the separation chamber.

The dehydration chamber is preferably of the freezer type dehydrator and is provided with insulation 69 to maintain its internal temperature low. A valve 68 is provided to allow the extract to pass out of the dehydrator.

The apparatus illustrated in Fig. 1 operates as follows in attaining the objects of this invention:

Green coffee beans are placed in the roasting chamber through the funnel 3. After the coffee is roasted and without loss of time, the roasted coffee is allowed to pass through valve 13 and through the chute 7 into the grinding chamber. In flowing through the chute 7, the coffee is chilled to a low temperature by the cooling coil 9. The valve 15 opens only when a predetermined amount of roasted coffee is accumulated in the chute 7 and therefore feeds to the grinding chamber a predetermined amount of coffee. The insulation 17 of the grinding chamber maintains the temperature of the coffee low. The coffee is ground in the grinding chamber and thence passes through the chute 19 to the extraction chamber 21. The cooling coil 23 of the grinding chamber and insulation 25 of chute 19 maintain the coffee at a low temperature. Dry Ice and water are placed into the extraction chamber through port 33. The Dry Ice serves to chill and carbonate the water. More Dry Ice is added than is sufficient to carbonate the water thereby producing free carbon dioxide to break up the agglomeration of coffee grounds; to displace included air in the coffee; to displace air included in the water; and to displace the free air present in the extraction chamber and thereby provide a carbon dioxide medium within the extraction chamber. The free air which has been displaced by the carbon dioxide passes out of the extraction chamber through the air escape valve 37. To attain these results it is preferred that one pound of Dry Ice and 38 gallons of water be placed in the extraction chamber for every 100 pounds of coffee. The extraction of the soluble ingredients and volatile aromatic substances is accelerated by stirring the mixture of water, Dry Ice and coffee as by stirrer 39 to produce an aqueous coffee extract. The insulation 31 maintains the coffee within the extraction chamber at a low temperature.

After the soluble substances and aromatic ingredients have been extracted from the coffee in the extraction chamber, both the aqueous coffee extract and the coffee residue flow through the chute 43 to the separating chamber. The cooling coil 47 of the extraction chamber and insulation 45 of the chute 43 maintain the coffee passing therethrough, at low temperature. The aqueous coffee extract is separated out from the coffee residue in the separation chamber preferably by centrifugalization at temperatures maintained low by insulation 55. The separation by centrifugalization serves to expedite the process. The separation chamber also serves to degasify the liquid extract of any carbon dioxide it may contain. The aqueous coffee extract is passed through the chute 57 into the dehydration chamber either by gravity or by means such as pump 58 and the coffee residue passes out through valve 60. The cooling coil 59 maintains the liquid extract passing through the chute 57 at a low temperature. In the dehydration chamber, the aqueous coffee extract is dehydrated to produce a dry coffee extract. This is accomplished at low temperatures preferably by freeze-dehydration, the internal temperature of the dehydration chamber being maintained low as by insulation 69 which surrounds it. The extract can be removed through valve 68. Since the liquid extract is highly concentrated, the step of dehydration requires a minimum amount of time and this is of the utmost importance in preserving all of the soluble coffee substances and volatile aromatic coffee ingredients.

It will be seen from the above that the process is an entirely cold and continuous one requiring a minimum amount of time. The absence of atmospheric air in the process prevents deterioration of the coffee extract and the low temperatures at which the process is practised prevents caramelization and lessens hygroscopicity in the dried product.

The process described above will extract most of the soluble ingredients and volatile aromatic substances from the coffee. However, an amount of the soluble ingredients and volatile aromatic substances are retained by the moist coffee residue. To remove all of these retained soluble ingredients and volatile aromatic substances, the re-extraction of the coffee residue may be advisable. This may be done by a secondary extraction and without dehydration. The secondary fluid extract may be used as part of the fluid needed for the extraction of a fresh batch of coffee grounds. This re-extraction step may be accomplished also by replacing the residue into the original extraction tank of Fig. 1 and proceeding as before with the addition of Dry Ice and cold water.

This re-extraction may also be accomplished by adding secondary equipment such as shown in Fig. 2 to Fig. 1. Part of the apparatus shown in Fig. 2 for practising the re-extraction is similar to the apparatus shown in Fig. 1. To this end, the roasting chamber has a funnel 103 to permit green coffee to be entered therein. The chute 107 has cooling coil 109 to cool coffee passing therethrough and normally closed manual valve 113 and spring valve 115 to regulate the flow of coffee. The grinding chamber is insulated at 117 and cooling coil 123. The grinding chamber is connected to the extraction chamber by means of the chute 119 having insulation 125 and normally closed valve 127. The extraction chamber has the port 33 closeable by the plug (not shown) to allow Dry Ice and water to be entered therein and has an air escape valve 137 to permit air to escape therefrom. The insulation 131 and the cooling coil 132 maintain its internal temperature low and the stirrer 139 carried by bracket 141 stirs the mixture to extract the soluble ingredients and volatile aromatic substances.

The chute 143 having insulation 145 and normally closed valve 149 allows the coffee extract and coffee residue to pass to the separation chamber and maintains the coffee extract and residue cool as they pass therethrough. The coffee extract is separated from the coffee residue in the separating chamber and it is degasified at low temperatures because of the insulation 155. The aqueous coffee extract passes, by means of pump 158, through the chute 157 having cooling coil 159, and valve 163, into the dehydration chamber having insulation 169, where the aqueous coffee extract is dehydrated at low temperatures. The coffee extract then passes from the dehydration chamber through valve 168. Thus far the process described is identical to the process described above.

The moist coffee residue remaining in the separation chamber is passed through the chute 200 to the re-extraction chamber in any conventional manner as by pump 202.

The chute 200 has a cooling coil 204 and insulation 206 to maintain the coffee residue passing therethrough cold. At its lower end the normally closed valve 205 is operable by the weight of the coffee residue and opens into the re-extraction chamber. The re-extraction chamber has insulation 210 and cooling coil 222 to maintain a low internal temperature. Dry Ice and water are added to the coffee residue preferably in the proportions pointed out above through the part 212. The air within the re-extraction chamber which is displaced by the excess of carbon dioxide is allowed to escape through air escape valve 216. After the remaining soluble ingredients and volatile aromatic substances have been re-extracted from the coffee residue, the residue and the aqueous extract pass to the re-separation chamber through chute 220 having insulation 224 and normally closed valve 226. The reseparation chamber is a centrifugal separator having the insulation 230 to maintain its interior cold and it separates the aqueous coffee extract from the coffee residue and also degasifies the liquid extract.

The reextracted aqueous extract is conveyed by pump 248 through chute 240, to the original extraction chamber and used there as part of the fluid needed for the extraction of a fresh batch of coffee grounds by the original extraction procedure. The chute is cooled and so maintained by coil 242 and insulation 244. The residue passes out of the reseparation chamber through valve 250.

For convenience of disclosure, the apparatus shown in the drawings for practicing the respective steps of the process, illustrates also the integration of these steps into a continuous process. It will be understood however that features of invention reside in individual steps as is indicated by the claims which follow and the invention is not to be limited to groups of steps except as to claims which specifically call therefor.

The inventive features have been disclosed as directed to the production of an extract from coffee. It will be understood however that some or all these features may be useable for making extracts of the aromatic and soluble ingredients contained in substances other than coffee and of which tea is an example, and in such event the reference to coffee shall be understood as typifying such other substances.

I claim:

1. The process of producing a coffee extract which includes the step of subjecting ground coffee to the solvent action of cold water at a temperature range of between somewhat above the freezing point of water and no higher than approximately 18° C., said water containing $CO_2$ sufficiently in excess of saturation not only to substantially replace the air in the water but also substantially to replace the air occluded in the ground coffee and the atmosphere immediately above the mixture.

2. The process set forth in claim 1 wherein the temperature of the water is within the approximate range of between 15° C. and 18° C.

3. The process set forth in claim 1 wherein the means for chilling and carbonating the water is Dry Ice added thereto.

4. The process set forth in claim 1 wherein the means for chilling and carbonating the water is Dry Ice added thereto in sufficient quantity to reduce the temperature of the water to within the approximate range of between 15° C. and 18° C.

5. The process of producing a coffee extract from ground coffee which includes adding three pints of water containing about 4.5 grams of Dry Ice to each pound of ground coffee whereby to chill the water down to a range of temperature of between 18° C. and somewhat above the freezing point of water and to fully saturate the water with carbonic acid gas so as substantially to replace the air therefrom and from the ground coffee and from the atmosphere immediately above the mixture.

References Cited in the file of this patent

UNITED STATES PATENTS

| Number | Name | Date |
|---|---|---|
| 1,009,610 | Wimmer | Nov. 21, 1911 |
| 1,390,008 | Arduino | Sept. 6, 1921 |
| 1,592,993 | Slate | July 20, 1926 |
| 1,687,112 | Slocum et al. | Oct. 9, 1928 |
| 1,896,230 | Farago | Feb. 7, 1933 |
| 2,045,319 | Waltrous | June 23, 1936 |
| 2,046,158 | Gore | June 30, 1936 |
| 2,077,564 | Heuser | Apr. 20, 1937 |
| 2,087,602 | McCrosson | July 20, 1937 |
| 2,116,308 | Gore | May 3, 1938 |
| 2,149,270 | Burgess | Mar. 7, 1939 |
| 2,264,390 | Levine et al. | Dec. 2, 1941 |
| 2,282,138 | Kellog | May 5, 1942 |
| 2,345,378 | Brandt | Mar. 28, 1944 |
| 2,410,157 | Fredrickson | Oct. 29, 1946 |
| 2,562,563 | McBean | July 31, 1951 |
| 2,639,237 | Johnston et al. | May 19, 1953 |
| 2,771,364 | Chase et al. | Nov. 20, 1956 |

FOREIGN PATENTS

| Number | Country | Date |
|---|---|---|
| 21,019 | Great Britain | Dec. 24, 1891 |
| 11,474 | Great Britain | July 13, 1901 |
| 161,920 | Great Britain | Sept. 22, 1921 |